United States Patent [19]
Ortiz et al.

[11] Patent Number: 5,641,915
[45] Date of Patent: Jun. 24, 1997

[54] DEVICE AND METHOD FOR MEASURING MULTI-PHASE FLUID FLOW IN A CONDUIT USING AN ELBOW FLOW METER

[75] Inventors: Marcos G. Ortiz, Idaho Falls, Id.;
Timothy J. Boucher, Helena, Mont.

[73] Assignee: Lockheed Idaho Technologies Company, Idaho Falls, Id.

[21] Appl. No.: 383,343

[22] Filed: Feb. 3, 1995

[51] Int. Cl.[6] ................................. G01L 1/12; G01L 1/25
[52] U.S. Cl. ......................................... 73/861.69; 73/861.42
[58] Field of Search ........................... 73/861.42, 861.69, 73/861.72

[56] References Cited

U.S. PATENT DOCUMENTS

| 970,965 | 9/1910 | Speed | 73/861.69 |
|---|---|---|---|
| 3,067,611 | 12/1962 | Bowers et al. | 73/861.69 |
| 4,277,832 | 7/1981 | Wong | 364/510 |
| 4,300,399 | 11/1981 | Kuijpers et al. | 73/861.04 |
| 4,470,311 | 9/1984 | Southwell | 73/861.69 |

FOREIGN PATENT DOCUMENTS

| 0224927 | 7/1985 | Germany | 73/861.42 |
|---|---|---|---|
| 1695129 | 11/1991 | U.S.S.R. | 73/861.42 |
| 1765696 | 9/1992 | U.S.S.R. | 73/861.42 |

OTHER PUBLICATIONS

Engineer-in-Training Reference Manual, 8th ed., Professional Publications, Inc., 1992, pp. 17–22 & 17–23 1992.

*Primary Examiner*—Richard Chilcot
*Assistant Examiner*—Paul D. Amrozowicz
*Attorney, Agent, or Firm*—Thorpe North & Western

[57] ABSTRACT

A system for measuring fluid flow in a conduit. The system utilizes pressure transducers disposed generally in line upstream and downstream of the flow of fluid in a bend in the conduit. Data from the pressure transducers is transmitted to a microprocessor or computer. The pressure differential measured by the pressure transducers is then used to calculate the fluid flow rate in the conduit. Control signals may then be generated by the microprocessor or computer to control flow, total fluid dispersed, (in, for example, an irrigation system), area of dispersal or other desired effect based on the fluid flow in the conduit.

10 Claims, 1 Drawing Sheet

DEVICE AND METHOD FOR MEASURING MULTI-PHASE FLUID FLOW IN A CONDUIT USING AN ELBOW FLOW METER

CONTRACTUAL ORIGIN OF THE INVENTION

The United States Government has rights in this invention disclosed under contract number DE-AC07-76ID01570 between the U.S. Department of Energy and EG&G Idaho, Inc., now contract number DE-AC07-94ID13223 with Lockheed Idaho Technologies Company.

BACKGROUND

1. Field of the Invention

This invention relates to apparatus and methods for measuring multi-phase (including single phase) mass flow in a conduit, such as water flow in an irrigation pipe, and relates more specifically to such apparatus and methods which are substantially non-obstructing.

2. Background Art

The desire to measure flow in a conduit has a long history dating back to the time of Caesar and the measurement of the flow of water to householders. More recent developments have led to a variety of applications for devices measuring flow in a conduit.

The need to measure fluid flow in a conduit may arise from a desire to control, track, or adjust the amount of fluid being delivered through the conduit. Naturally, measuring the flow in a conduit is useful in a number of applications. One such application is the flow of water through a sprinkler pipe, particularly in agricultural irrigation applications.

It is desirable to measure the flow of water in a sprinkler pipe for several reasons. Among these reasons is the desire to track the amount of water delivered to a given tract of land so that adequate irrigation for the crop being grown is provided. Additionally, in regions where irrigation is needed water is usually a precious commodity and, therefore, the efficient use of water is highly desirable. For such reasons, irrigation systems require the ability to monitor the delivery of water and thus flow measurement is critical.

A number of devices for measuring flow exist for various applications. The size of the conduit being used, accuracy, cost, and other factors all play in a role in determining what type of device will be used for a specific application.

One of the most widely used type of device is the differential producing flowmeter. The basic idea in this type of device for measuring flow is to utilize the principle that when the flow in a conduit is contracted (or squeezed) kinetic energy increases at the expense of available potential energy. A common factor, therefore, in existing devices for measuring flow in this fashion is to contract the flow through the conduit. This is accomplished by using some means of obstructing or reducing the flow of material through the conduit. Typical systems for reducing the flow include installing a section of pipe which tapers to a significantly smaller diameter, inserting a blockage in the pipe, or creating some other obstruction.

As will be appreciated, contracting the flow of water through a sprinkler pipe is undesirable for a number of reasons. For example, irrigation water often contains debris which can become lodged in a small diameter pipe or caught on an obstruction. This can result in plugging of the pipe. Plugged pipes require time, energy, and expense to repair. In addition, serious incidents may jeopardize crops which go unwatered during the time spent unplugging the pipe. This is particularly true during critical periods in a crop's growing cycle.

An additional problem with differential producing devices currently available is that there is often significant retrofitting required to incorporate them into the system where flow is being measured. For example, in the case of devices which use a gradual reduction in the diameter of the conduit, a relatively long section of conduit must be removed and replaced with a tapering conduit section.

Yet another problem with current devices for measuring flow in a conduit is that variations in temperature and humidity can adversely effect their operability. This is particularly true if the variations in temperature or humidity are pronounced. Unfortunately, these are often exactly the types of conditions encountered in agricultural irrigation applications in arid regions. Arid regions can experience wide variations in temperature with hot days and cold nights. In addition, the irrigation systems themselves may cause variations in humidity.

Another prior art approach to measuring flow rate is the so-called elbow flow meter in which a curved section of pipe (the elbow) in the fluid delivery system is fitted with pressure sensors to measure pressure differential in the elbow. In order to measure the flow accurately, the sensors must be precisely placed in both the outer and inner circumferential walls of the elbow, in the same radial plane, and then must be calibrated. (See J. W. Murdock et al., "Performance characteristics of Elbow Flow Meters," Trans. of the ASME, September 1964.)

It would be an advantage in the art to provide a differential producing device for measuring flow which would be relatively simple to install, substantially accurate through differing temperature and humidity ranges, and substantially non-obstructing such that the likelihood of plugging of the conduit in the area of the device is lessened.

BRIEF SUMMARY AND OBJECTS OF THE INVENTION

The present invention is an apparatus for measuring the flow of fluid through a conduit. The measurement apparatus includes an apparatus for detecting the effect of existing changes of the flow of material in the conduit such that a pressure differential is created, a sensor for measuring the pressure differential created by the contracting apparatus, and a device for calculating the flow through the conduit from data collected from the sensor.

In a preferred embodiment, the contracting apparatus includes either a gradual arc in the conduit or an elbow in the conduit. The sensor includes a pressure transducer placed upstream from the arc or elbow and a pressure transducer placed along the arc or elbow. Finally, the calculation device is a microprocessor or computer which has been programmed to calculate flow based on the data received from the sensors. The microprocessor or computer may also be used to send control signals so as to control, for example, the amount of fluid delivered, the rate of delivery, or the area of delivery.

Accordingly, it is a primary object of the present invention to provide such apparatus which may be installed and used without calibration.

It is a further object of the present invention to provide such apparatus which may be installed and used without calibration.

A still further object of the present invention is to utilize configurations often found in conduit such as a gradual arc or an elbow.

Still another object of the present invention is to provide an apparatus which is simple to install and which avoids the extensive changes and retrofitting typically associated with installing an apparatus for measuring flow through a conduit.

An additional object of the present invention is to provide a rugged apparatus which is substantially immune to fluctuations in temperature and humidity.

These and other objects of the present invention will become apparent from the following description and appended claims or may be learned by the practice of the invention as set forth herein.

BRIEF DESCRIPTION OF THE DRAWINGS

In order to more fully understand the manner in which the above-recited and other advantages and objects of the present invention are obtained, a more particular description of the invention briefly described above will be rendered by reference to the presently understood best mode for making and using the same, as illustrated in the appended drawings. Understanding that these drawings depict only typical embodiments of the invention and are, therefore, not to be considered as limiting of its scope, the invention will be described with additional specificity and detail through the use of the accompanying drawings in which.

DETAILED DESCRIPTION OF THE INVENTION

Figure 1:
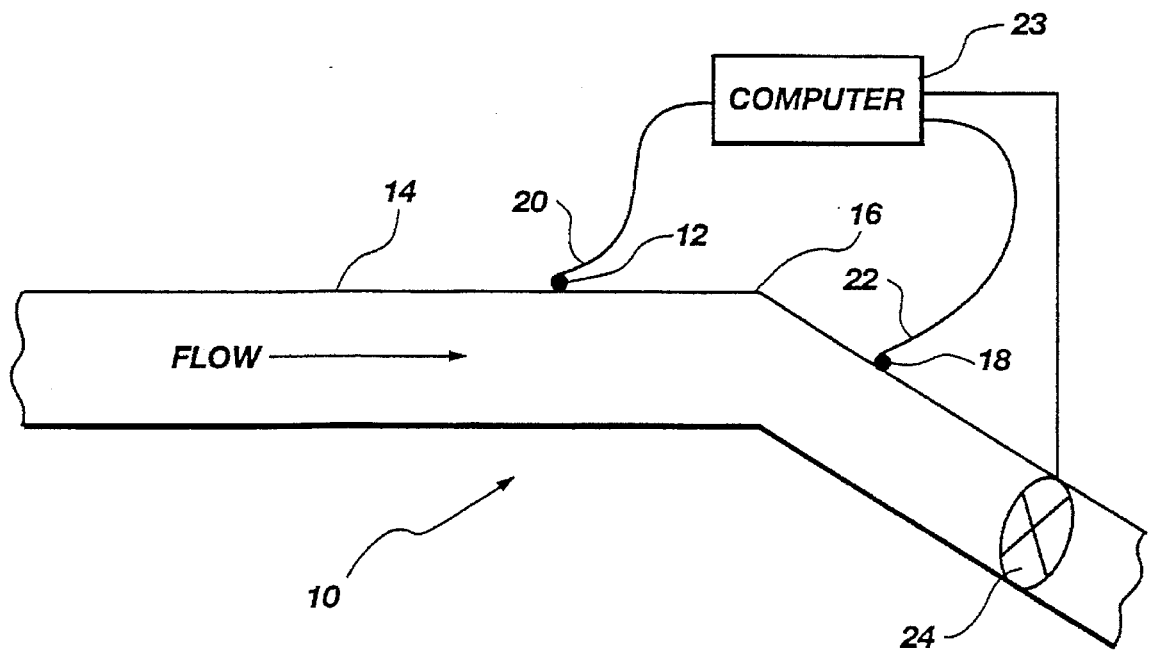
FIG. 1 is a cross sectional view of an embodiment of the present invention utilizing a conduit having a bend or elbow.
Figure 2:
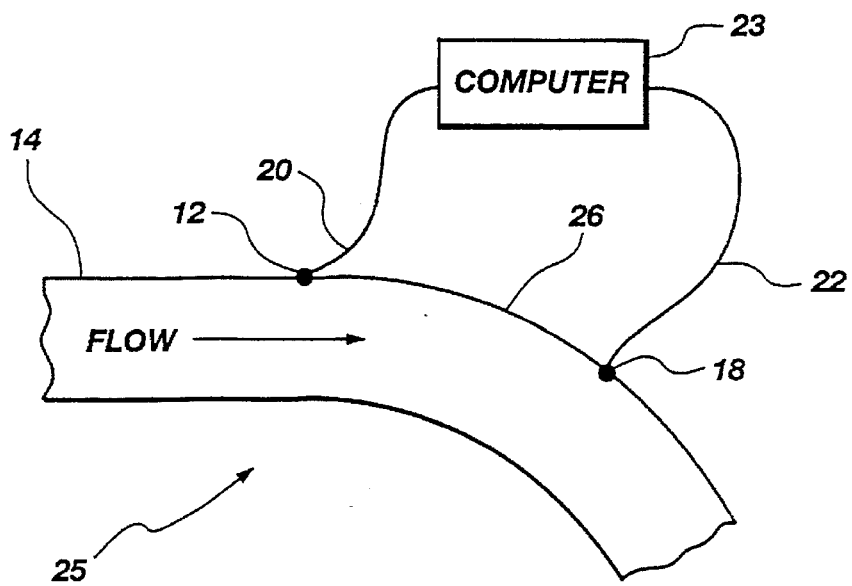
FIG. 2 is a cross sectional view of an embodiment of the present invention utilizing a conduit having a gradual arc.

Reference is now made to the embodiments illustrated in FIGS. 1 and 2 wherein like numerals are used to designate like parts throughout. A currently preferred embodiment of the present invention is generally designated at 10 in FIG. 1. The direction of flow of the material in embodiment 10 is also depicted.

As shown, the apparatus for measuring flow in a conduit comprises a leading pressure transducer or sensor 12 placed along the portion of conduit 14 upstream from bend 16. In this embodiment bend 16 is shown as being sharp and is thus sometimes called an elbow.

A trailing pressure transducer 18 is placed along the outer wall of conduit 14 downstream from bend 16 and generally on the same side of the conduit as upstream sensor 12 and in line with one another. In addition, upstream sensor 12 and downstream sensor 18 are disposed on the outside curvature of bend 16. It will be appreciated that additional transducers may be employed to provide verification, enhanced accuracy, fault tolerance or for other reasons. An exemplary transducer which could be utilized is the Omega low pressure differential transducer PX 150/154 Series.

This configuration has several advantages. For example, positioning upstream sensor 12 and downstream sensor 18 on the same side of conduit 14 allows for ease of accessibility, since only one side of the conduit need be accessible. Additionally, placing upstream sensor 12 and downstream sensor 18 substantially in line with each other eliminates the need for calibration of the system.

Transducers may be placed in the conduit by tapping the conduit and inserting the preferred pressure transducer or pressure sensing device. The transducer may be held in place by threaded engagement with the conduit, adhesives, or other conventional mechanism.

Naturally, maintaining the integrity of the seal between the transducer and the conduit is important to avoid leaking around the transducer or dislodgement of the transducer. A durable seal can be obtained by a variety of installations.

For example, if the transducer and the conduit are threadingly engaged a teflon tape may be used on the threads to prevent leakage. As another example, a small portion of the conduit could be removed and a pressure transducer apparatus made to replace the portion of conduit removed could be installed. As will be appreciated, most techniques for creating a waterproof seal in a pressurized environment will also be applicable to the present invention.

The simplicity of installing pressure transducers by tapping into the conduit and the necessity of insuring the integrity of the seal around the transducers naturally results in a rugged durable system. In addition, the choice of pressure transducer can add to the ruggedness and durability of the system.

The precise placement of the pressure transducers may vary somewhat while maintaining good results. Caution should be exercised, however, in placing pressure transducers precisely at the corner of the straight pipe and the angle as a stagnation area may exist at this point. Particularly in the event that only two pressure transducers are used, placing one in this region may yield erroneous readings.

Leading pressure transducer 12 has an associated communication line 20. Similarly, trailing pressure transducer 18 has an associated communications line 22. These communications lines allow data to be conveyed to a computer 23. The computer 23 may be simply a currently available microprocessor such as any 8-bit commercial CPU chip.

Once the pressure transducers are positioned, the flow of fluid through the conduit can be calculated from data transmitted to the computer as follows:

$$mf = \left(\frac{A}{\sin\alpha}\right)\sqrt{\Delta P \rho}$$

Where mf is the mass flow in kilograms per second; A is the cross section area of the pipe in square meters; $\alpha$ is the angle of the bend; $\Delta P$ is the pressure difference between the trailing pressure transducer 18 and the leading pressure transducer 12; and $\rho$ is the fluid density in kilograms per cubic meter.

In agricultural irrigation applications, a typical sprinkler conduit for delivering irrigation water would be four inch schedule forty pipe. In such a case, A would be approximately 0.008213 square meters and $\rho$ would be approximately 996 kilograms per cubic meter. If the bend were approximately 45° as depicted for bend 16 in FIG. 1, then $\sin\alpha$ would be approximately 0.7071 and the calculation becomes:

$$mf = 0.3665647\sqrt{\Delta P}$$

It will be appreciated that a range of values for these variables can be imagined based on differing fluids being delivered, different pipe size, and different bend angles.

Calculation of flow results can be used by the computer to control flow of fluid through the system through controls 24. For example, in an agricultural irrigation system, monitoring the flow rates could be used to control the amount of water delivered to a field, to shut off the system when delivery was completed or in case of a malfunction, or for various other control functions. Controls 24 will typically comprise electronically controlled valves although more complex control means may be employed.

As depicted, system 10 is substantially non-intrusive. Only pressure transducers 12 and 18 extend into conduit 14 but in such a limited fashion as to be substantially non-intrusive. Additionally, system 10 does not require that conduit 14 be restricted. Some turbulence in the flow of material in the area of bend 16 is to be expected, however, the reduction in flow associated with many other pressure flow devices is significantly reduced or eliminated.

The use of this non-obstructive means of measuring flow in a conduit has the advantage of significantly reducing or eliminating problems of plugging. As will be appreciated, water used for agricultural irrigation often contains debris of various types, and such debris may find its way into an irrigation system.

In other systems, the substantial restriction in flow caused by reducing the diameter of the pipe can result in the lodging of debris in the area of the flow measuring apparatus. In other applications employing protrusions into the pipe, debris may become lodged on the protrusion causing additional debris to build up and eventually resulting in plugging of the pipe.

The present invention, by substantially eliminating any intrusion into the pipe, reduces or eliminates areas where debris can become lodged and thus significantly reduces or eliminates the opportunity for plugging to occur.

Reducing or eliminating plugging extends the life of the present invention over many prior systems. As will be appreciated, when a system becomes plugged it can be severely damaged or destroyed. By reducing or eliminating plugging, the present invention reduces or eliminates the associated damage.

Turning to FIG. 2, an alternative embodiment of the present invention is depicted and shown generally at 25. In this embodiment a gradual arc 26 is employed. As in the embodiment shown in FIG. 1, a leading transducer 12 and a trailing transducer 18 are utilized. Leading transducer 12 is placed along the conduit 14 prior to the beginning of arc 26 on the straight section. Trailing transducer 18 is placed along the outer wall of the conduit of arc 26.

As with the FIG. 1 system, the transducers 12 and 18 of the FIG. 2 system are disposed on the outside of the arc and generally in line with one another.

Also as in the embodiment of FIG. 1, additional transducers may be employed if desired. Once the transducers are positioned, the flow can be calculated using the formula above adjusted to correspond to the specific angle of the arc utilized.

As will be appreciated, a range of arcs or bend angles can be utilized while maintaining the advantage of a substantially non-obstructing apparatus for measuring flow in a conduit.

In many systems, bends in the conduit may already exist. For example, agricultural irrigation systems often include elbows or general arcs of the type depicted in FIGS. 1 and 2. In these instances, the only retrofitting required to install the system of the present invention is installation of the pressure transducers and the computer or other controller.

Even in the event the system has no elbows or arcs, installation of the system of the present invention is relatively simple. The elbow or arc can be installed by replacing a fairly minimal section of pipe as compared to prior systems which often require that a substantial length of pipe be replaced. The simplicity of the system of the present invention also helps reduce costs and time for installation.

Although the examples throughout this discussion have related to measurement of the flow of single phase water in a sprinkler pipe for agricultural irrigation it is contemplated that the present invention will have application in other arenas. For example, the present invention lends itself to the measurement of mixtures and fluids containing impurities such as of the flow of slurry through a pipe such as coal slurry, or multiple phase mixtures like oil, water, gas, and sand. Other examples would include measurement of flow of municipal waste water and measurement of two-phase flow in a power plant. Clearly, any number of additional applications for the present invention can be envisioned.

In the case of multiple flow applications, knowledge of flow density is required. It can be derived from two flow meters placed at a known distance along the pipe or by correlating the flow meter reading and another instrument in the vicinity of the flow meter which measures or allows you to calculate the density of the fluid.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

We claim:

1. A system for measuring fluid flow in a conduit comprising:

a substantially non-obstructing bend means formed in the conduit for creating a pressure differential in the fluid in said conduit;

a first sensor means for measuring pressure of the fluid in said conduit positioned upstream from said bend means so as not to intrude into the fluid flow and having an associated communication means for conveying data representing said pressure measurement by said first sensor means;

a second sensor means for measuring pressure of the fluid in said conduit positioned at said bend means generally in line with the first sensor means so as not to intrude into the fluid flow and having an associated communication means for conveying data representing said pressure measurement by said second sensor means; and a control means for calculating fluid flow rate through the conduit from said conveyed data.

2. A system for measuring fluid flow in a conduit as defined in claim 1 wherein said non-obstructing bend means comprises a length of conduit having a gradual arc, and wherein said first sensor means is disposed upstream of the arc of the conduit, and wherein said second sensor means is disposed on the outside of the arc of the conduit.

3. A system for measuring fluid flow in a conduit as defined in claim 1 wherein said non-obstructing bend means comprises a length of conduit having an elbow, and wherein said first and second sensor means are disposed on the outside of the bend means in the conduit.

4. A system for measuring fluid flow in a conduit as defined in claim 1 wherein said calculation means comprises a computer.

5. A system for controlling delivery of fluid through a conduit comprising:

a substantially non-obstructing bend means formed in said conduit for creating a pressure differential in said fluid in said conduit;

a first sensor means for measuring pressure in said conduit positioned upstream from said bend means disposed partially but non-intrusively within said conduit;

a second sensor means for measuring pressure in said conduit positioned at said bend means disposed partially but non-intrusively within said conduit and generally in line with the first sensor means;

a plurality of communication means for conveying data from said sensor means;

a computer means for calculating fluid flow rate through the conduit from said conveyed data and for determining appropriate delivery of said fluid through said conduit;

a plurality of control means disposed in said conduit for controlling flow of said fluid through said conduit; and a plurality of control communication means for conveying control signals from said computer to said control means to thereby control flow in the conduit.

6. A system for controlling delivery of fluid through a conduit as defined in claim 5 wherein said control means comprise electronically controlled valves.

7. A system for controlling delivery of fluid through a conduit as defined in claim 5 wherein said bend means comprises a length of conduit having a gradual arc, and wherein said first and second sensor means are disposed on the outside of the arc of the conduit.

8. A system for controlling delivery of fluid through a conduit as defined in claim 5 wherein said bend means comprises a length of conduit having an abrupt elbow, and wherein said sensor means are disposed on the outside curvature of the bend means.

9. A method for measuring fluid flow in a conduit, the method comprising the steps of:

positioning a plurality of pressure transducers along a bend in said conduit generally on the same side of said conduit, a first pressure transducer being positioned upstream from said bend and a second pressure transducer being positioned on the outside of the bend at said bend generally in line with the first pressure transducer;

conveying data from said plurality of pressure transducers to a microcomputer; and the microcomputer calculating fluid flow from said data using known constants for the cross-sectional area of said conduit, the angle of said bend, the density of said fluid flowing through said conduit and from the pressure difference between the readings from said pressure transducers located downstream from said bend and said pressure transducers located upstream from said bend.

10. A method for measuring fluid flow in a conduit as defined in claim 9 wherein said method further comprises the step of developing control signals based on said calculation of said fluid flow.

* * * * *